Aug. 25, 1925.

J. G. HOMAN

DILATOR

Filed May 18, 1922

1,551,499

INVENTOR.
John G. Homan
by Clarke & Doolittle
his attorneys

Patented Aug. 25, 1925.

1,551,499

UNITED STATES PATENT OFFICE.

JOHN G. HOMAN, OF STEUBENVILLE, OHIO, ASSIGNOR TO THE ELECTRO-THERMAL COMPANY, OF STEUBENVILLE, OHIO, A CORPORATION OF OHIO.

DILATOR.

Application filed May 18, 1922. Serial No. 561,807.

*To all whom it may concern:*

Be it known that I, JOHN G. HOMAN, a citizen of the United States, residing at Steubenville, in the county of Jefferson and State of Ohio, have invented certain new and useful Improvements in Dilators, of which the following is a specification.

This invention relates to dilators, and particularly to a method and means for heating the same.

The therapeutic value of heat as a stimulator in the treatment of rectal diseases and constipation by dilation is not questioned. I have heretofore used heat generated electrically in connection with dilation, as shown for instance in my Patent No. 1,279,111 of September 17, 1918. It has also been proposed to apply heat through the circulation of hot water through the dilator.

The circulation of hot water through the dilator is inconvenient and hard to control, and a hollow dilator merely filled with hot water is not only hard to control, especially when it is being filled, but a sufficiently uniform or lasting temperature for beneficial results is not obtained. Electrically heated dilators, while more easily operated and controlled, require some bother when being connected up, and more or less attention must be given to the temperature control thereof.

In no instance has a dilator satisfactory for daily home treatment by the patient been provided, where the physician could be certain that there would not be excessive heating or any over stimulation by heating for too long a time, as when the patient falls asleep while using the dilator; nor could he be assured that sufficient heat would be applied for a sufficient period.

The present invention proposes to heat a dilator through a medium capable of providing a sustained heat of practically constant and uniform value for a considerable period of time wherein a temperature rise above a desired maximum is not possible, all control of the temperature being taken out of the hands of any operator. A dilator heated in accordance with my invention may be used under any circumstances with absolute safety. Even should the patient fall asleep during the treatment, he is absolutely protected against any rise in temperature. This virtue is now only found in the dilator filled with hot liquid, and one so heated may initially be too hot or too cold, and by reason of its limited capacity, the temperature is a rapidly declining one as compared with my invention.

Figure 1:
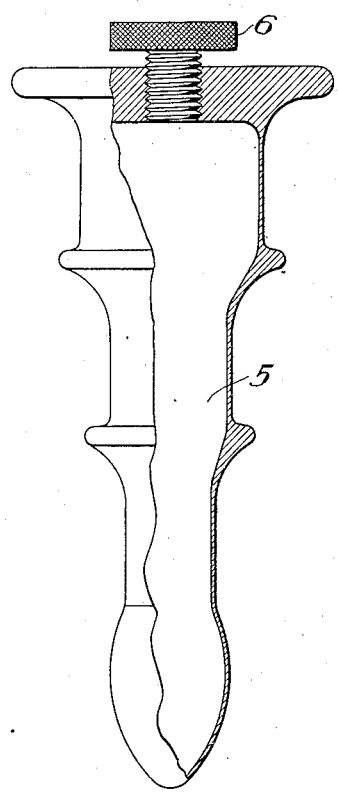
Figure 2:
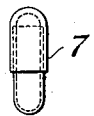

My invention may be readily understood by referring to the accompanying drawings in which, Fig. 1 shows a dilator partly in section and partly in elevation; and Fig. 2 shows a capsule which may be used in connection therewith.

In the accompanying drawing, Fig. 1 shows a dilator which may have its exterior shaped to provide for one or more steps of dilation. The body of the dilator comprises a hollow shell providing an interior chamber 5. The larger or outer end of the dilator may be provided with a filling opening in which is a removable plug 6. I prefer that the dilator be formed of metal, though any suitable material could be used.

The cavity or hollow interior of the dilator is charged with a solution of sodium hyposulphite in water. Instead of a saturated solution, commercial crystals of the salt may be loaded into the cavity. The crystals will contain sufficient water of crystallization to cause them to liquefy upon the dilator being immersed in a bath of hot water, or otherwise suitably heated. Hence, either the solution or the crystals may be used.

If the dilator now be immersed in boiling water and afterward allowed to cool, it will be found that the contents will comprise a liquid solution of the hyposulphite of soda, and will remain so until crystallization is started within the cavity. This may be done at the will of the operator by removing plug 6 and inserting an additional crystal of sodium hyposulphite or by temporarily inserting a foreign object, such as a splinter or toothpick.

Once crystallization has begun, the plug 6 may be screwed tightly into place and the crystallizing process will continue until all of the hyposulphite of soda is crystallized. This metamorphose will be accompanied by the liberation of considerable heat over a somewhat extended period. As the action is uniform, and proceeds only at a definite rate, there will be no fluctuation in the amount of heat given off, and the temperature in no case will exceed a maximum which, for treatment of this nature, should not exceed 115 degrees Fahrenheit.

After having once used the dilator, it is only necessary to immerse it in boiling water again for a few minutes to prepare it for use again. The usual sterilization by hot water after each treatment is sufficient. After being heated, crystallization may then be effected as before described.

Instead of using a hyposulphite of soda solution, other chemical agents may be employed. For instance, heat generated by chemical reactions of certain natures may be employed. As illustrative of this, the cavity 5 may be filled with water, and metallic sodium or potassium in a water soluble capsule, as shown in Fig. 2, may be employed. In this instance, the capsule designated 7, is dropped into the water and heat generated by the chemical reaction between the water and metal is utilized. Furthermore, the maximum temperature is not exceeded, and no manual control is necessary. The amount of heat generated, however, is not so prolonged as that provided by the sodium hyposulphite solution. Furthermore, a new charge of water and of chemical is necessary for each application of the dilator. It removes, however, the necessity for careful temperature control on the part of the user. In place of the chemical action described, other well known combinations might be employed.

While it is admittedly old to apply heat to a dilator as hereinbefore described, and while the physical or chemical properties of the substances herein mentioned are also well known, it has not been proposed to heat dilators used for internal dilation by such means. Owing to the extremely limited space which the cavity provides, the heating medium may not be of great volume, and due to the beneficial properties which are sought by the treatment, it is extremely important that absolute control be obtained to prevent the applied heat from rising above a maximum, and avoid injury to the patient. Properties of certain recognized chemicals insure the desired results in the confined limits available, providing heat at the desired temperature in sufficient quantities and without any possibility of manual control.

From the foregoing, it will be seen that I provide a simple appliance, which is inexpensive, which a physician may avail himself of in prescribing home treatment for a patient, and which he may be sure will give sufficient heat at a sufficient temperature, but from which no injurious result can come from excessive temperatures or from over stimulation by application for too long a period. The size of the cavity or the amount of chemical placed therein provide a definite time during which heat will be liberated, and danger from over-stimulation is thus limited.

By requiring heat for re-use, it is ensured that the dilator will be thoroughly cleaned and sterilized after each application.

I claim as my invention:

1. A dilator comprising a hollow body of the desired shape and dimensions having an opening therein, a closure for said opening, and a saturated solution of sodium hyposulphite in the interior thereof or the crystals resulting from crystallization of such material.

2. The combination with a hollow body member shaped to effect orificial dilation, of a saturated solution of sodium hyposulphite within the hollow body, said body having a removable closure at one end for giving access to its hollow interior.

3. The combination with a hollow transversely round body member having an exterior form of gradually increasing diameter designed to effect orificial dilation, of a substance within said hollow body having the property of generating heat when passing from one form into another, and a removable plug at the larger end of said body through which access may be had to the interior of the body.

In testimony whereof I affix my signature.

JOHN G. HOMAN.